(12) United States Patent
Park et al.

(10) Patent No.: US 8,748,337 B2
(45) Date of Patent: Jun. 10, 2014

(54) PREPARATION METHOD OF MULTI-METALS / ACTIVATED CARBON COMPOSITES

(75) Inventors: Soo-Jin Park, Daejeon (KR); Byung-Joo Kim, Iksan-si (KR)

(73) Assignee: INHA—Industry Partnership Institute, Incheon (KR)

( * ) Notice: Subject to any disclaimer, the term of this patent is extended or adjusted under 35 U.S.C. 154(b) by 752 days.

(21) Appl. No.: 11/789,483

(22) Filed: Apr. 25, 2007

(65) Prior Publication Data

US 2007/0251827 A1 Nov. 1, 2007

(30) Foreign Application Priority Data

Apr. 28, 2006 (KR) .................. 10-2006-0038836

(51) Int. Cl.
*B01J 23/00* (2006.01)
*B01J 23/70* (2006.01)
*B01J 23/74* (2006.01)
*B01J 23/42* (2006.01)
*B01J 23/44* (2006.01)

(52) U.S. Cl.
USPC ............ 502/325; 502/338; 502/339; 502/352

(58) Field of Classification Search
USPC .................. 502/302, 300, 325, 338, 339, 352
See application file for complete search history.

(56) References Cited

U.S. PATENT DOCUMENTS

| | | | | |
|---|---|---|---|---|
| 4,321,240 | A * | 3/1982 | Robinson ................. | 423/210 |
| 6,284,402 | B1 * | 9/2001 | Mallouk et al. ............ | 429/40 |
| 6,419,837 | B1 * | 7/2002 | Akse ........................ | 210/752 |
| 6,814,777 | B2 * | 11/2004 | Biberbach ................ | 75/255 |
| 2001/0055851 | A1 * | 12/2001 | Horii ........................ | 438/393 |
| 2002/0100734 | A1 * | 8/2002 | Lee .......................... | 210/760 |
| 2003/0138698 | A1 * | 7/2003 | Lee et al. .................. | 429/231.8 |

FOREIGN PATENT DOCUMENTS

| | | | |
|---|---|---|---|
| JP | 59-159999 A | 9/1984 | |
| JP | 02-084540 | 3/1990 | |
| JP | 11-111298 | 4/1999 | |
| JP | 2003-260360 A | 9/2003 | |
| JP | 2007-516826 A | 6/2007 | |
| JP | 2007-270049 A | 10/2007 | |
| KR | 10-2003-0095695 A | 12/2003 | |
| KR | 10-2004-0091344 A | 10/2004 | |
| KR | 10-0512476 | * 10/2004 | .............. B01J 20/20 |
| WO | WO 01/76736 A | 10/2001 | |

OTHER PUBLICATIONS

Jung, K.H. et al., "Effect of Additives and Plating Conditions on Sn—Pb Alloy Film of Semiconductor or Formed by High Speed Electroplating", *J.Kor.Inst.Surf.Eng*, vol. 36, No. 1, 2003 pp. 34-41 (Article is in Korean, however, there is an English abstract).

* cited by examiner

*Primary Examiner* — Eli Mekhlin
(74) *Attorney, Agent, or Firm* — Frommer Lawrence & Haug LLP; Ronald R Santucci

(57) ABSTRACT

The present invention relates to a method for preparing a multi-metals/activated carbon composite, more particularly to a method for preparing a multi-metals/activated carbon composite, which is prepared by electrochemical electroplating of an alloy plate comprising at least two metals and activated carbons fixed on a conductive support under a predetermined condition. The multi-metals/activated carbon composite prepared in accordance with the present invention has improved adhesion force and specific surface area than those of a conventional composite obtained by continuously plating activated carbons, in which metal salts are impregnated, or metals and good reactivity due to the introduction of pure metals. Since the composition and content of metals can be controlled accurately, the multi-metals/activated carbon composite is useful as an active material for filters for removing gaseous or liquid pollutants, secondary cells, fuel cells, capacitors, hydrogen storage electrodes, etc.

9 Claims, 1 Drawing Sheet

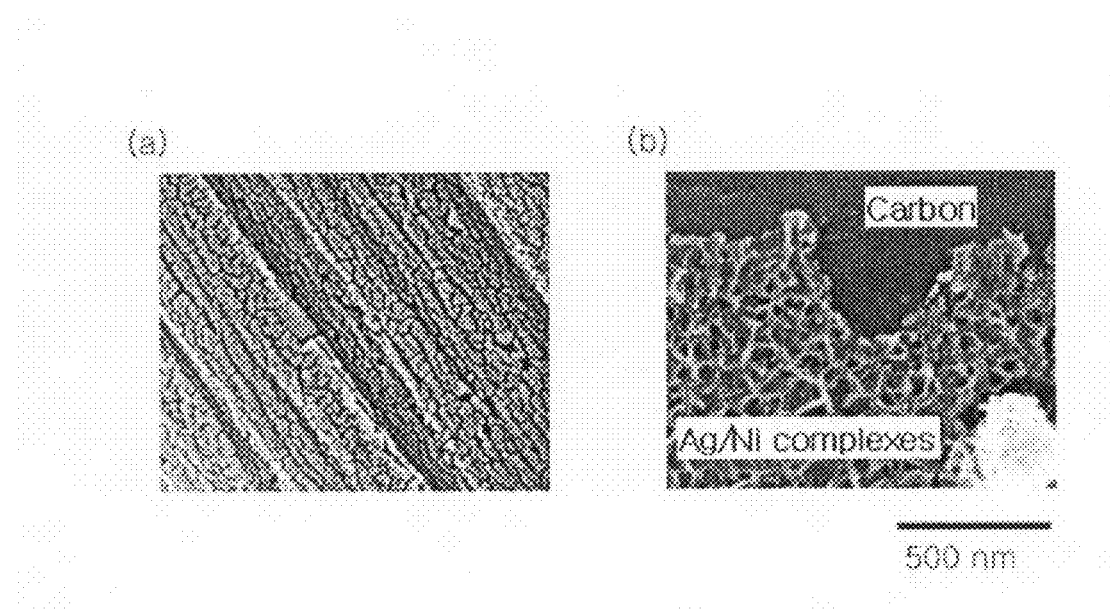

PREPARATION METHOD OF MULTI-METALS / ACTIVATED CARBON COMPOSITES

CROSS REFERENCE TO RELATED APPLICATIONS

This application is based on, and claims priority from Korean Application No. 10-2006-0038836, filed on Apr. 28, 2006, the disclosure of which is hereby incorporated by reference.

TECHNICAL FIELD

The present invention relates to a method for preparing a multi-metals/activated carbon composite, more particularly to a preparation method of a multi-metals/activated carbon composite, which is prepared by electrochemical electroplating of an alloy plate comprising at least two metals and activated carbons fixed on a conductive support under a predetermined condition. The multi-metals/activated carbon composite prepared in accordance with the present invention has improved adhesion force and specific surface area than the conventional composite obtained by continuously plating activated carbons, in which metal salts are impregnated, or metals and good reactivity due to the introduction of pure metals. Since the composition and content of metals can be controlled accurately, the multi-metals/activated carbon composite is useful as an active material for manufacturing filters for removing gaseous or liquid pollutants, secondary cells, fuel cells, capacitors, hydrogen storage electrodes, etc.

BACKGROUND ART

With the rapid development of modern industries, there has been growing interest on environmental pollution. Activated carbons (ACs) and activated carbon fibers (ACFs) have superior capability of removing pollutants. With large specific surface area, they have good adsorption capabilities. Further, with micropores exposed on the surface, they have high adsorption rates. Besides, they are advantageous in terms of economical efficiency and environmental friendliness. Particularly, with good stability, recyclability and processability, activated carbon has many applications in solvent recovery, purification of industrial products, purification of sewage and wastewater, adsorption and removal of noxious combustion gases, and so forth as prepared in the form of powder, granule or fiber. In addition, with large specific surface area and well-developed pore structure, activated carbon is useful as active materials for secondary cells, fuel cells, supercapacitors, hydrogen storage media, etc.

There have been many researches carried out on metal impregnation, chemical reduction, metal plating, etc., as a way to improve functions of an electrode by dipping metals on activated carbons. Of these, metal plating is considered as an economical method because metal loss can be reduced due to good adhesion between metals and carbon surface, and also a good reactivity can be attained because metals are protruding from the surface and the conventionally produced activated carbon can be used without special treatment.

TECHNICAL PROBLEM

Impregnation and chemical reduction are typical metal supporting methods, but they are not advantageous in that the pore structure tends to be blocked by metal salts and there is a serious level of metal loss because of poor adhesion between metals and carbon surface.

Further, the addition of metal in the precursor state results in loss of metal and thus is uncompetitive and requires the modification of the existing process for the preparation of metal/carbon composites. Single metal plating is without a particular problem. But, in continuous multi-metal plating, where different metals are used, the activated carbon on which the first plating has been performed has a significantly increased conductivity. Thus, the second plating occurs rapidly, resulting in conglomeration of metal particles. As a result, the control of metal content becomes difficult and the blocking of the pore structure by the metals becomes severe.

TECHNICAL SOLUTION

The present inventors have made various efforts to solve the problems occurring in connection with the conventional impregnation and metal supporting method, including metal loss, metal content control, pore maintenance, etc. In doing so, they discovered that a multi-metals/activated carbon composite prepared by performing electrochemical electroplating using an anode made of an alloy plate comprising at least two metals and a cathode made of activated carbon fixed on a conductive support has improved adhesion force than the conventional composite obtained by impregnating metal salt in activated carbon or continuously plating metals, experiences less decrease of specific surface area because of reduced penetration of metals into the activated carbon and makes accurate control of metal composition and content possible.

Accordingly, an object of the present invention is to provide a n method for preparing a multi-metals/activated carbon composite in which at least two metals are introduced in activated carbon through performing electroplating using an alloy plate comprising at least two metals and a conductive support.

BRIEF DESCRIPTION OF DRAWINGS

FIG. 1 shows the scanning electron micrographs (SEM) of the activated carbon fiber (a) prepared in Comparative Example 1 and the multi-metals/activated carbon composite (b) prepared in Example 5 in accordance with the present invention.

BEST MODE

In an embodiment of the present invention, there is provided a method for preparing a multi-metals/activated carbon composite, which comprises at least two metals, on the surface of activated carbon, by performing electroplating using an anode made of an alloy plate comprising at least two metals and a cathode made of activated carbon fixed on a conductive support.

Hereunder is given a detailed description of the present invention.

The present invention relates to a multi-metals/activated carbon composite prepared by introducing at least two metals to activated carbon by performing electroplating using an alloy plate comprising at least two metals and a conductive support. As at least two pure metals are electrochemically introduced to the surface of activated carbon, the multi-metals/activated carbon composite of the present invention has improved adhesion force than the conventional composites prepared by impregnating metal salts in activated carbon or continuously plating metals and thus experiences less secondary contamination. Further, with less penetration of metals into the activated carbon, the multi-metals/activated carbon composite experiences less decrease of specific surface area and has well-developed pores. And, since an alloy plate comprising at least two metals is used, an accurate control of metal composition and content is possible and an improved reaction rate can be attained.

An important technical feature of the present invention is that a multi-metals/activated carbon composite is prepared by electroplating using an anode made of an alloy plate comprising at least two metals and a cathode made of activated carbon fixed on a conductive support. Hereunder is given a more detailed description.

Preferably, the activated carbon is one commonly used by those skilled in the art, with well-developed micropores and large specific surface area in order to attain exposed activation sites. Specifically, activated carbon or activated carbon fiber is preferred. The activated carbon may be in the form of powder, granule, fragment, filter or fiber.

Preferably, the conductive support is one commonly used by those skilled in the art, in the form of a net made of a conductive metal. Specifically, a net made of a conductive metal selected from iron, silver, nickel, copper and zinc and with a hole size of 0.1-100 mesh is preferred. The conductive support fixes the activated carbon and increases the conductivity of the activated carbon during electroplating.

The activated carbon is fixed on the conductive support by a method commonly used in the art. Although not limiting the scope of the present invention, it is preferred that activated carbon fiber or activated carbon be inserted between two conductive nets and fixed by clips or pins after compression. Such prepared conductive net/activated carbon is put in an electrolytic bath and plating begins at the surface of the activated carbon under a predetermined condition from the area where it contacts the conductive net. After sufficient metal plating, the conductive net is removed and an activated carbon plated with pure metal is obtained.

The alloy plate is made of at least two metals which will be comprised in the composite. The alloying is performed by a method commonly used by those skilled in the art. Although not limiting the scope of the present invention, an alloy plate prepared by melting is used in the present invention. The metal may be any one that can be introduced to the activated carbon by electroplating. Although not limiting the scope of the present invention, it is preferred that a transition metal adequate for removing liquid or gaseous pollutant, specifically one selected from Cu, Ni, Ag, Al, Fe, Co, Cr, Pt, Ru and Sn is used. Especially, a composite prepared using Pt is very useful for removing toxic gases because the metal functions as an active component.

A multi-metals/activated carbon composite is prepared by electroplating using the activated carbon and alloy plate. The resultant composite comprises 0.1-200 wt % of metal relative to 100 wt % of activated carbon. If the metal content is below 0.1 wt %, the original purpose of its introduction cannot be attained. In contrast, if it exceeds 200 wt %, specific surface area may decrease, resulting in the limitation of applicability of the multi-metals/activated carbon composite.

The electroplating is performed for from 1 second to 2 hours, preferably for 1 second to 30 minutes. If the plating time is shorter than 1 second, sufficient electroplating cannot be attained. In contrast, if it exceeds 2 hours, blocking of pore structure and decrease of specific surface area may due to the coagulation of metal particles. And, preferably, the electroplating is performed at a current density of 0.1-200 A/m$^2$, preferably 0.1-100 A/m$^2$. If the current density is below 0.1 A/m$^2$, sufficient electroplating cannot be attained. In contrast, if it exceeds 200 A/m$^2$, plating occurs explosively, resulting in rapid growth of metal particles and decrease of specific surface area.

Such prepared multi-metals/activated carbon composite is useful as an active material for manufacturing filters for removing gaseous or liquid pollutants, secondary cells, fuel cells, capacitors and hydrogen storage electrodes.

DETAILED DESCRIPTION OF THE EMBODIMENTS OF THE INVENTION

Reference will now be made in detail to a preferred embodiment of the present invention. The embodiments are described below so as to explain the present invention by referring to the figures.

EXAMPLE 1

A Pt/Ru alloy metal plate was placed at the anode. Activated carbon fiber (AW2001, specific surface area=2120 m$^2$/g, Taiwan Carbon) was fixed between two 400 cm$^2$-wide wire nets of 8 mesh and electroplating was performed to prepare a multi-metals/activated carbon composite. Plating time was 5 seconds and current density was 0.1 A/m$^2$. The electroplated sample was sufficiently washed with double distilled water, dried in a dryer set at 120° C. and kept in a desiccator for 24 hours.

EXAMPLE 2

A multi-metals/activated carbon composite was prepared the same as in Example 1, except for using a Cu/Cr alloy metal plate instead of the Pt/Ru alloy metal plate. Plating time was 20 seconds and current density was 1.0 A/m$^2$. The electroplated sample was sufficiently washed with double distilled water, dried in a dryer set at 120° C. and kept in a desiccator for 24 hours.

EXAMPLE 3

A multi-metals/activated carbon composite was prepared the same as in Example 1, except for using a Cu/Ag alloy metal plate instead of the Pt/Ru alloy metal plate. Plating time was 30 seconds and current density was 2.0 A/m$^2$. The electroplated sample was sufficiently washed with double distilled water, dried in a dryer set at 120° C. and kept in a desiccator for 24 hours.

EXAMPLE 4

A multi-metals/activated carbon composite was prepared the same as in Example 1, except for using a Cu/Fe alloy metal plate instead of the Pt/Ru alloy metal plate. Plating time was 2 minutes and current density was 3.0 A/m$^2$. The electroplated sample was sufficiently washed with double distilled water, dried in a dryer set at 120° C. and kept in a desiccator for 24 hours.

EXAMPLE 5

A multi-metals/activated carbon composite was prepared the same as in Example 1, except for using an Ag/Ni alloy metal plate instead of the Pt/Ru alloy metal plate. Plating time was 5 minutes and current density was 3.0 A/m$^2$. The electroplated sample was sufficiently washed with double distilled water, dried in a dryer set at 120° C. and kept in a desiccator for 24 hours.

EXAMPLE 6

A multi-metals/activated carbon composite was prepared the same as in Example 1, except for using a Cu/Ni alloy metal plate instead of the Pt/Ru alloy metal plate. Plating time was 90 seconds and current density was 3.0 A/m². The electroplated sample was sufficiently washed with double distilled water, dried in a dryer set at 120° C. and kept in a desiccator for 24 hours.

EXAMPLE 7

A multi-metals/activated carbon composite was prepared the same as in Example 1, except for using a Pt/Co alloy metal plate instead of the Pt/Ru alloy metal plate. Plating time was 10 seconds and current density was 1.0 A/m². The electroplated sample was sufficiently washed with double distilled water, dried in a dryer set at 120° C. and kept in a desiccator for 24 hours.

EXAMPLE 8

A multi-metals/activated carbon composite was prepared the same as in Example 1, except for using an Al/Fe alloy metal plate instead of the Pt/Ru alloy metal plate. Plating time was 5 minutes and current density was 5.0 A/m². The electroplated sample was sufficiently washed with double distilled water, dried in a dryer set at 120° C. and kept in a desiccator for 24 hours.

EXAMPLE 9

A multi-metals/activated carbon composite was prepared the same as in Example 1, except for using an Ag/Cr/Pt alloy metal plate instead of the Pt/Ru alloy metal plate. Plating time was 10 minutes and current density was 5.0 A/m². The electroplated sample was sufficiently washed with double distilled water, dried in a dryer set at 120° C. and kept in a desiccator for 24 hours.

EXAMPLE 10

A multi-metals/activated carbon composite was prepared the same as in Example 1, except for using a Cu/Cr/Fe alloy metal plate instead of the Pt/Ru alloy metal plate. Plating time was 15 minutes and current density was 6.0 A/m². The electroplated sample was sufficiently washed with double distilled water, dried in a dryer set at 120° C. and kept in a desiccator for 24 hours.

EXAMPLE 11

A multi-metals/activated carbon composite was prepared the same as in Example 1, except for using a Cr/Co/Al alloy metal plate instead of the Pt/Ru alloy metal plate. Plating time was 8 minutes and current density was 5.0 A/m². The electroplated sample was sufficiently washed with double distilled water, dried in a dryer set at 120° C. and kept in a desiccator for 24 hours.

EXAMPLE 12

A multi-metals/activated carbon composite was prepared the same as in Example 1, except for using an Al/Co/Fe alloy metal plate instead of the Pt/Ru alloy metal plate. Plating time was 20 minutes and current density was 6.0 A/m². The electroplated sample was sufficiently washed with double distilled water, dried in a dryer set at 120° C. and kept in a desiccator for 24 hours.

EXAMPLE 13

A multi-metals/activated carbon composite was prepared the same as in Example 1, except for using a Cu/Ni/Ag alloy metal plate instead of the Pt/Ru alloy metal plate. Plating time was 30 minutes and current density was 6.0 A/m². The electroplated sample was sufficiently washed with double distilled water, dried in a dryer set at 120° C. and kept in a desiccator for 24 hours.

COMPARATIVE EXAMPLE 1

The AW2001 activated carbon fiber used in Example 1 was used without plating. The activated carbon fiber was washed 3 times with triple distilled water and dried in an oven of 120° C. for 24 hours.

COMPARATIVE EXAMPLE 2

Cu and Ag metal salts were impregnated with the same composition of Example 3. 0.5 M $CuSO_4$ and $AgNO_3$ were used as Cu and Ag metal salts, respectively. Impregnation was performed for 30 seconds at 80 rpm. After washing once with triple distilled water, the sample was dried in an oven of 120° C. for 24 hours. Following heat treatment in an oven of 250° C. under nitrogen atmosphere, the sample was kept in a desiccator.

COMPARATIVE EXAMPLE 3

A multi-metals/activated carbon composite was prepared the same as in Example 1, except that each metal plate was electroplated separately. Plating time was 30 minutes and current density was 6.0 A/m². The electroplated sample was sufficiently washed with double distilled water, dried in a dryer set at 120° C. and kept in a desiccator for 24 hours.

EXPERIMENTAL EXAMPLE

Metal composition and content and specific surface area of the composites prepared in Examples 1-13 and Comparative Examples 1-3 were measured according to the following methods. The result is given in Table 1 below.

1) BET Specific Surface Area (m²/g)

About 0.1 g of activated carbon fiber was taken under liquid nitrogen atmosphere of 77 K. Adsorption amount of nitrogen gas was determined in order to measure the specific surface area of the activated carbon fiber. The sample was pretreated by degassing at 573 K for about 9-12 hours until the residual pressure inside the temple decreased below $10^{-3}$ torr. The isothermal $N_2$ adsorption test result showed that the adsorption amount increased linearly while $P/P_o$ (P=partial pressure, $P_o$=saturation vapor pressure) was from about 0.05 to about 0.3. BET specific surface area was calculated from the slope.

2) Metal Content (wt %)

Content of metals introduced to the metal/activated carbon composite was determined by atomic absorption spectrophotometry (AAS).

TABLE 1

| Classification | Plating time | Current density (A/m²) | Metal composition | Supporting amount (wt %*) | Specific surface area (m²/g) |
|---|---|---|---|---|---|
| Comparative Example 1 | — | — | — | 0 | 2120 |
| Example 1 | 5 seconds | 0.1 | Pt/Ru | 0.06/0.04 | 2070 |
| Example 2 | 20 seconds | 1.0 | Cu/Cr | 2.6/1.8 | 1920 |
| Example 3 | 30 seconds | 2.0 | Cu/Ag | 4.5/2.3 | 1880 |
| Example 4 | 2 minutes | 3.0 | Cu/Fe | 6.0/5.1 | 1710 |
| Example 5 | 5 minutes | 3.0 | Ag/Ni | 5.2/8.7 | 1650 |
| Example 6 | 90 seconds | 3.0 | Cu/Ni | 2.2/5.8 | 1860 |
| Example 7 | 10 seconds | 1.0 | Pt/Co | 0.2/0.9 | 1950 |
| Example 8 | 5 minutes | 5.0 | Al/Fe | 7.5/20.8 | 1410 |
| Example 9 | 10 minutes | 5 | Ag/Cr/Pt | 12.5/6.5/0.1 | 1660 |
| Example 10 | 15 minutes | 6.0 | Cu/Cr/Fe | 65.2/7.4/21.2 | 910 |
| Example 11 | 8 minutes | 5.0 | Co/Cr/Al | 4.2/2.1/12.5 | 1810 |
| Example 12 | 20 minutes | 6.0 | Al/Cr/Fe | 30.5/5.1/80.1 | 830 |
| Example 13 | 30 minutes | 6.0 | Cu/Ni/Ag | 112.3/61.0/28.5 | 610 |
| Comparative Example 2 | Impregnated for 30 seconds | — | CuSO₄ (0.5M) AgNO₃ (0.5M) | 1.2/0.9 | 1730 |
| Comparative Example 3 | 30 minutes each | 6.0 | Pt/Ru | 82.5/65.0 | 730 |

*Metal supporting amount relative to the amount of activated carbon

As shown in Table 1, the composites of the present invention (Example 1-13) showed decreased specific surface area than the one without metal (Comparative Example 1). Comparative Example 2, in which metal salts were impregnated, had significantly less metal content than those of the present invention and experienced severe decrease of specific surface area. Comparative Example 3, in which each metal plate was electroplated separately, required more time and, because of coagulation of metal particles, control of metal content was difficult and had the problems of specific surface area decrease and plating control due to the blocking of pores by the metal particles.

FIG. 1 shows the difference of specific surface area of the activated carbon fiber prepared in Comparative Example 1 and the multi-metals/activated carbon composite prepared in Example 5 in accordance with the present invention.

Industrial Applicability

As apparent from the above description, the multi-metals/activated carbon composite prepared in accordance with the present invention is advantageous in that the control of metal composition and content is facile and it has large specific surface area, maintaining good pore structure. Thus, it is expected to be useful as active material for manufacturing filters for removing gaseous or liquid pollutants and electrode materials.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A method for preparing a multi-metals/activated carbon composite by forming a composite, which comprises at least two metals, on the surface of activated carbon by performing electroplating using an anode made of an alloy plate comprising at least two metals and a cathode made of activated carbon fixed on a conductive support;
   wherein said metals introduced to the surface of the activated carbon are at least two transition metals selected from Ni, Al, Fe, Co, Pt, Ru, and Sn.

2. The method of claim 1, wherein said electroplating is performed for from 1 second to 2 hours at a current density of 0.1-200 A/m2.

3. The method of claim 1, wherein said activated carbon is activated carbon or activated carbon fiber in the form of powder, granule, fragment, filter or fiber.

4. The method of claim 1, wherein said conductive support is in the form of a net made of a conductive metal.

5. The method of claim 1, wherein said metals are contained in the amount of 0.1-200 wt% relative to 100 wt% of the activated carbon.

6. The method of claim 1, wherein said metals introduced to the surface of the activated carbon are Pt and Ru.

7. The method of claim 1, wherein said composite is suitable for the adsorption of pollutants.

8. A method for preparing a multi-metals/activated carbon composite by forming a composite, which comprises at least two metals, on the surface of activated carbon by performing electroplating using an anode made of an alloy plate comprising at least two metals and a cathode made of activated carbon fixed on a conductive support;
   wherein the alloy plate consists essentially of Pt and Ru; Cu and Cr; Cu and Ag: Cu and Fe; Ag and Ni; Cu and Ni; Pt and Co; Al and Fe; Ag, Cr, and Pt; Cu, Cr, and Fe; Co, Cr, and Al; Al, Cr, and Fe; or Cu, Ni, and Ag.

9. The method of claim 8, wherein said alloy plate consists essentially of Pt and Ru; Cu and Fe; Ag and Ni; Cu and Ni; Pt and Co; Al and Fe; Ag, Cr, and Pt; Cu, Cr, and Fe; Co, Cr, and Al; Al, Cr, and Fe; or Cu, Ni, and Ag.

* * * * *